United States Patent
McGinnis et al.

(10) Patent No.: US 7,032,054 B1
(45) Date of Patent: Apr. 18, 2006

(54) METHOD AND APPARATUS FOR INCREASING THE DEVICE COUNT ON A SINGLE ATA BUS

(75) Inventors: Kevin W. McGinnis, Berthoud, CO (US); Bob Southerland, Dacono, CO (US); LeRoy Leach, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 244 days.

(21) Appl. No.: 09/877,525

(22) Filed: Jun. 8, 2001

Related U.S. Application Data (60) Provisional application No. 60/210,713, filed on Jun. 9, 2000.

(51) Int. Cl.
*G06F 13/14* (2006.01)

(52) U.S. Cl. .......................... 710/305; 710/62
(58) Field of Classification Search ................ 710/107
See application file for complete search history.

(56) References Cited

U.S. PATENT DOCUMENTS

| | | | | |
|---|---|---|---|---|
| 3,731,279 A | * | 5/1973 | Halsall et al. | 700/67 |
| 4,864,291 A | * | 9/1989 | Korpi | 340/825.5 |
| 4,926,314 A | * | 5/1990 | Dhuey | 711/172 |
| 5,243,703 A | * | 9/1993 | Farmwald et al. | 713/400 |
| 5,504,868 A | * | 4/1996 | Krakirian | 710/5 |
| 5,581,716 A | * | 12/1996 | Park | 710/110 |
| 5,619,659 A |   | 4/1997 | Kikinis et al. | 395/281 |
| 5,644,705 A |   | 7/1997 | Stanley | 395/183.18 |
| 5,696,912 A | * | 12/1997 | Bicevskis et al. | 710/305 |
| 5,727,184 A | * | 3/1998 | Richter et al. | 710/62 |
| 5,881,249 A |   | 3/1999 | Reasoner | 395/281 |
| 5,909,592 A | * | 6/1999 | Shipman | 710/10 |
| 5,920,709 A | * | 7/1999 | Hartung et al. | 710/305 |
| 6,112,309 A | * | 8/2000 | Inoue et al. | 713/501 |
| 6,141,728 A | * | 10/2000 | Simionescu et al. | 711/113 |
| 6,223,229 B1 | * | 4/2001 | Kvamme | 710/10 |
| 6,349,345 B1 | * | 2/2002 | Sims et al. | 710/8 |
| 6,678,768 B1 | * | 1/2004 | Craft | 710/100 |

FOREIGN PATENT DOCUMENTS

EP 348148 A2 * 12/1989

* cited by examiner

*Primary Examiner*—Paul R. Myers
(74) *Attorney, Agent, or Firm*—Tejpal S. Hansra (57) ABSTRACT

The present invention allows more than two devices to be connected to a single ATA bus. The devices are each assigned a unique identifier, and a controller selects a device by sending a selection command that includes a selection identifier across data lines of the ATA bus to the devices. The devices each receive the selection command and compare the selection identifier to the assigned identifier. The device which matches the selection identifier to its assigned identifier is selected, and the other devices are not selected.

100 Claims, 5 Drawing Sheets

METHOD AND APPARATUS FOR INCREASING THE DEVICE COUNT ON A SINGLE ATA BUS

CROSS-REFERENCE TO RELATED APPLICATIONS

This application claims priority from U.S. Provisional Patent Application Ser. No. 60/210,713, filed Jun. 9, 2000 entitled "Increasing the Disk Drive Count on a Single ATA Bus" which is incorporated herein by reference in its entirety.

FIELD OF THE INVENTION

The present invention relates to increasing the device count on a single ATA bus. In particular, the present invention allows more than two devices to be connected to a single ATA bus.

BACKGROUND OF THE INVENTION

Various host computers (and most personal computers) include an Advanced Technology Attachment (ATA) controller for communicating with ATA devices using an ATA bus. The controller typically has two channels, each of which is connected to an ATA bus, and each ATA bus can be connected to two devices. The host computer can include additional controllers to connect to more devices. However, additional controllers add cost, do not allow for command overlapping between devices and do not improve performance. Furthermore, appropriate cabling is difficult.

Alternative bus protocols are available. For instance, the small computer system interface (SCSI) allows 255 SCSI devices to be connected to a single SCSI bus. However, SCSI devices are expensive, and the SCSI controller is not normally provided in a personal computer. Furthermore, although SCSI improves performance over ATA, the SCSI data rate cannot be fully exploited by most host computers and SCSI devices.

Accordingly, it would be advantageous to increase the number of devices that can be connected to a single ATA bus.

SUMMARY OF THE INVENTION

The present invention allows more than two devices to be connected to a single ATA bus.

In accordance with an embodiment of the present invention, the devices are each assigned a unique identifier, and the controller selects a device by sending a selection command that includes a selection identifier across data lines of the ATA bus to the devices. The devices each receive the selection command and compare the selection identifier to the assigned identifier. The device which matches the selection identifier to its assigned identifier is selected, and the other devices are not selected. The selected device prepares to receive an additional command or data from the ATA bus, and the other devices disconnect themselves from the ATA bus.

In accordance with another embodiment of the present invention, the selected device updates its status register and asserts PDIAG and INTRQ in response to the selection command, and the controller reads the status register of the selected device to verify proper device selection in response to the PDIAG and INTRQ assertions.

In accordance with another embodiment of the present invention, the controller includes DASP, PDIAG and INTRQ registers, the ATA bus includes multiple DASP, PDIAG and INTRQ lines connected to the DASP, PDIAG and INTRQ registers, and the devices share the data lines but have dedicated DASP, PDIAG and INTRQ lines.

In accordance with another embodiment of the present invention, the controller includes DASP, PDIAG and INTRQ registers, the ATA bus includes multiple DASP, PDIAG and INTRQ lines connected to the DASP, PDIAG and INTRQ registers, and the devices share the data lines and the DASP, PDIAG and INTRQ lines.

Advantageously, the present invention allows more than two devices to be connected to a single ATA bus with only slight modifications to the bus system.

Additional advantages of the present invention will become readily apparent from the following discussion, particularly when taken together with the accompanying drawings.

DETAILED DESCRIPTION

Figure 1:
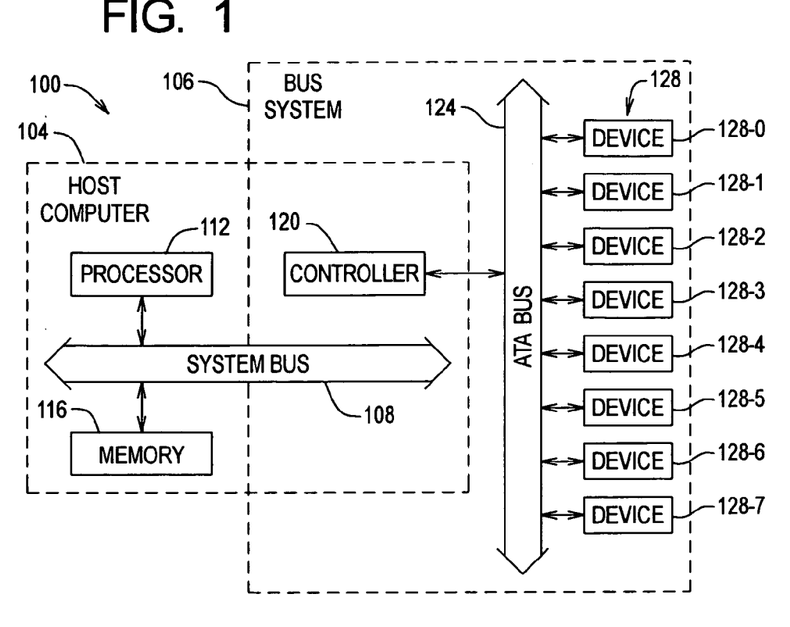
FIG. 1 is a block diagram illustrating a computer system that includes a bus system with a controller, an ATA bus and devices.

FIG. 1 illustrates in block diagram form a computer system 100 that includes a host computer 104 and a bus system 106. The host computer 104 includes a system bus 108, a processor 112, a system memory 116 and a controller 120. The bus system 106 includes the controller 120, a single ATA bus 124 and devices 128 designated as devices 128-0, 128-1, 128-2, 128-3, 128-4, 128-5, 128-6 and 128-7. Thus, the host computer 104 and the bus system 106 share the controller 120.

The controller 120 provides an ATA interface that connects the system bus 108 to the ATA bus 124. Thus, the controller 120 translates between the protocols of the system bus 108 and the ATA bus 124. The controller 120 also connects the system bus 108 to the devices 128 via the ATA bus 124.

The ATA bus 124 includes the ATA signal lines such as data lines and the DASP (device active, slave present), PDIAG (passed diagnostic) and INTRQ (interrupt request) lines under the ATA protocol. Likewise, the signal lines are terminated under the ATA protocol. The ATA bus 124 also includes a ribbon cable, a ribbon connector connected to the controller 120 and edge connectors connected to the devices 128. However, unlike a conventional ATA bus, the ATA bus 124 has eight edge connectors (rather than two) to provide separate edge connectors for each of the eight devices 128.

The devices 128 are ATA storage devices such as hard disk drives, floppy drives, optical drives and tape drives. The devices 128 include ATA connection pins such as data, DASP, PDIAG and INTRQ connection pins for connecting with the corresponding signal lines in the ATA bus 124. Furthermore, the devices 128 are each assigned a unique identifier. The identifiers may be assigned through hardware or software. For example, the identifiers may be assigned using jumpers on the exteriors of the devices 128. Alternatively, the identifiers may be assigned by setting software switches during the initialization of the devices 128.

The host computer 104 can perform ATA command and data transfer operations across the ATA bus 124 with any of the devices 128. The controller 120 sends a selection command that includes a selection identifier over the data lines to the devices 128. The selection command can be issued at any time the data lines are available, and need not be issued during a selection phase, a command phase or a resolution phase. The devices 128 share the data lines and therefore receive the selection command and its selection identifier from the ATA bus 124. The devices 128 each compare the selection identifier to the assigned identifier. For example, the devices 128 include a processor with firmware that compares the selection identifier to the assigned identifier. If a device 128 is selected (the selection identifier matches the assigned identifier), then it sends a confirmation signal over the ATA bus 124 to the controller 120. The remaining devices 128 are not selected (the selection identifier does not match the assigned identifier) and disconnect from the ATA bus 124. The controller 120 then exchanges information (such as commands and data) over the ATA bus 124 with the selected device 128. The controller 120 can subsequently de-select the selected device 128 and select another device 128 by issuing another selection command with a different selection identifier over the data lines.

In an embodiment, the controller 120 is a conventional ATA controller with modified firmware, the ATA bus 124 is a conventional ATA bus with eight edge connectors, and the devices 128 are conventional ATA devices with modified firmware. In another embodiment, the controller 120 is a conventional ATA controller with modified firmware and additional hardware (such as control registers and logic gates), the ATA bus 124 is a conventional ATA bus with eight edge connectors and additional hardware (such as separate DASP, PDIAG and INTRQ lines for each edge connector), and the devices 128 are conventional ATA devices with modified firmware. In yet another embodiment, the devices 128 determine whether the additional hardware is present and respond to the selection command based on the determination.

In an embodiment, the controller 120 selects the devices 128 by asserting a single selected data line, and the ATA bus 124 includes N data lines and N edge connectors. In this instance, the ATA bus 124 can support as many as N devices 128. In another embodiment, the controller 120 selects the devices 128 by sending a binary number across the data lines, and ATA bus 124 includes N data lines, N DASP lines, N PDIAG lines, N INTRQ lines, $2^N$ edge connectors and decoding logic that converts the DASP, PDIAG and INTRQ signals at the edge connectors into a binary number that is sent across the data lines to the controller 120. In this instance, the ATA bus 124 can support as many as $2^N$ devices 128.

Figure 2:
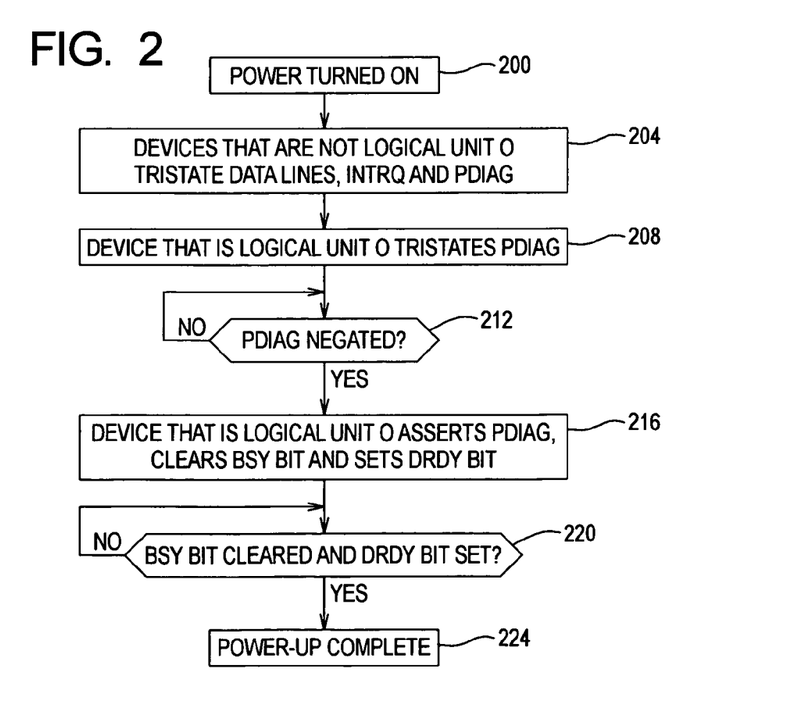
FIG. 2 is a flowchart illustrating operational steps taken during power-up of the bus system without additional hardware.

FIG. 2 illustrates power-up of the bus system 106. Initially, the power is turned on (step 200). The devices 128 that are not logical unit zero (not designated as the master) tristate the data lines, INTRQ and PDIAG (step 204). To tristate a signal line means that the device 128 sets its driver for that signal line to a high impedance condition, as is well-known under the ATA protocol. The device 128 that is the logical unit zero then tristates PDIAG (step 208).

A determination is made as to whether PDIAG has been negated (the devices 128 have all tristated PDIAG) (step 212). If not, the bus system 106 waits. If so, the device 128 that is logical unit zero asserts PDIAG, clears its BSY (busy) bit in its status register and sets its DRDY (device ready) bit in its status register (step 216). A determination is then made as to whether the BSY bit is cleared and the DRDY bit is set (step 220). If not, the bus system 106 waits. If so, power-up of the bus system 106 is complete (step 224).

Figure 3:
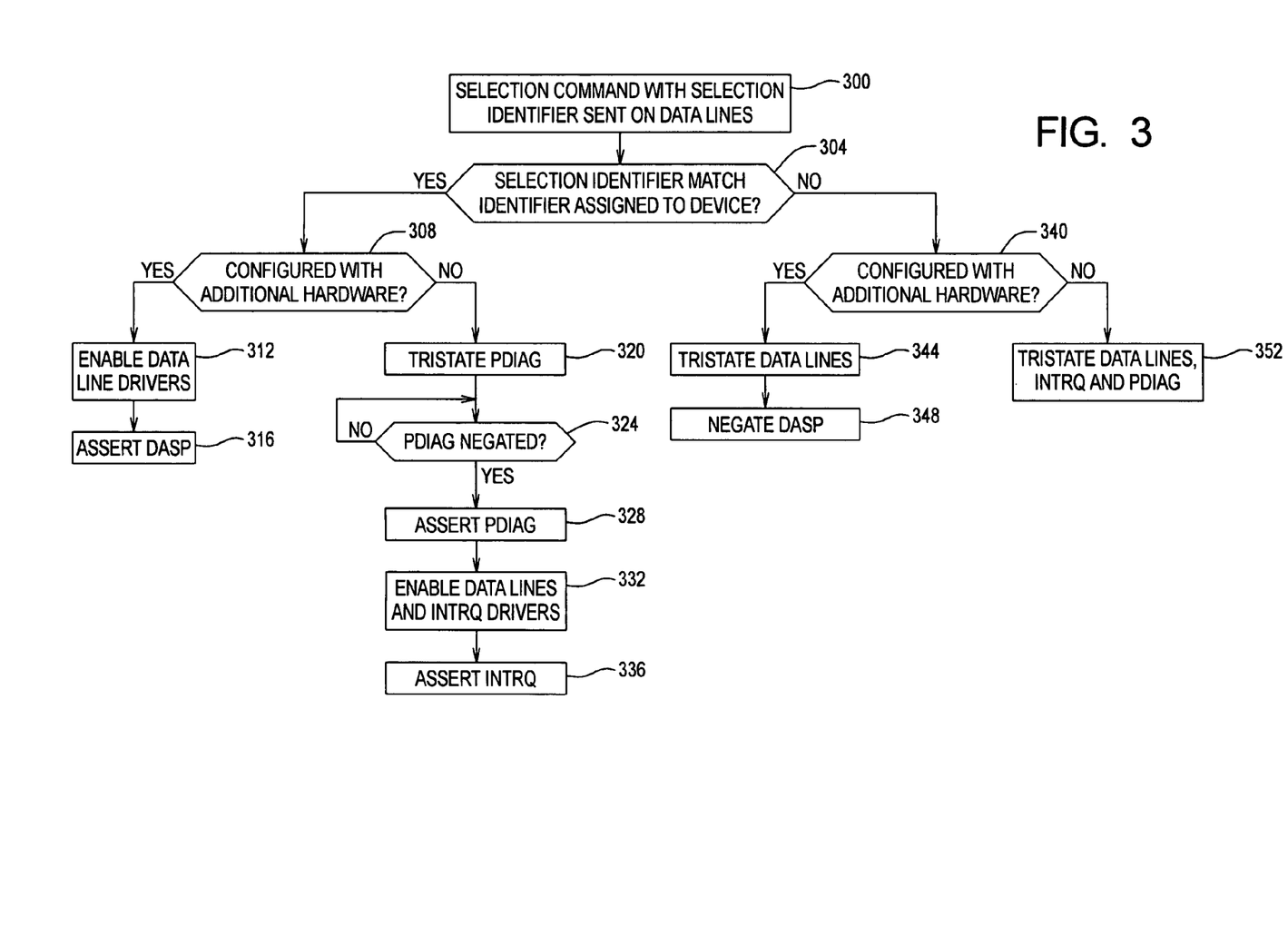
FIG. 3 is a flowchart illustrating operational steps taken by a device in response to a selection command that includes determining whether the bus system includes additional hardware.

FIG. 3 is a flowchart illustrating the response of a device 128 to a selection command. Initially, a selection command that includes a selection identifier is sent on data lines of the ATA bus 124 (step 300). Each device 128 determines whether the selection identifier matches its assigned identifier (step 304).

If a device 128 determines that the selection identifier matches its assigned identifier, the selected device 128 next determines whether the bus system 106 includes additional hardware (step 308). In particular, the selected device 128 determines whether the controller 120 includes additional control registers. If so, the selected device 128 enables its data lines drivers (step 312) and asserts DASP (step 316). If not, the selected device 128 tristates PDIAG (step 320), determines whether PDIAG is negated and idles until PDIAG is negated (step 324). Once PDIAG is negated, the selected device 128 asserts PDIAG (step 328), enables its data lines and INTRQ drivers (step 332) and asserts INTRQ (step 336).

If a device 128 determines that the selection identifier does not match its assigned identifier (step 304), the device 128 determines whether the bus system 106 includes additional hardware (step 340). If so, the device 128 tristates the data lines (step 344) and negates DASP (step 348). If not, the device 128 tristates the data lines, INTRQ and PDIAG (step 352).

Figure 4:
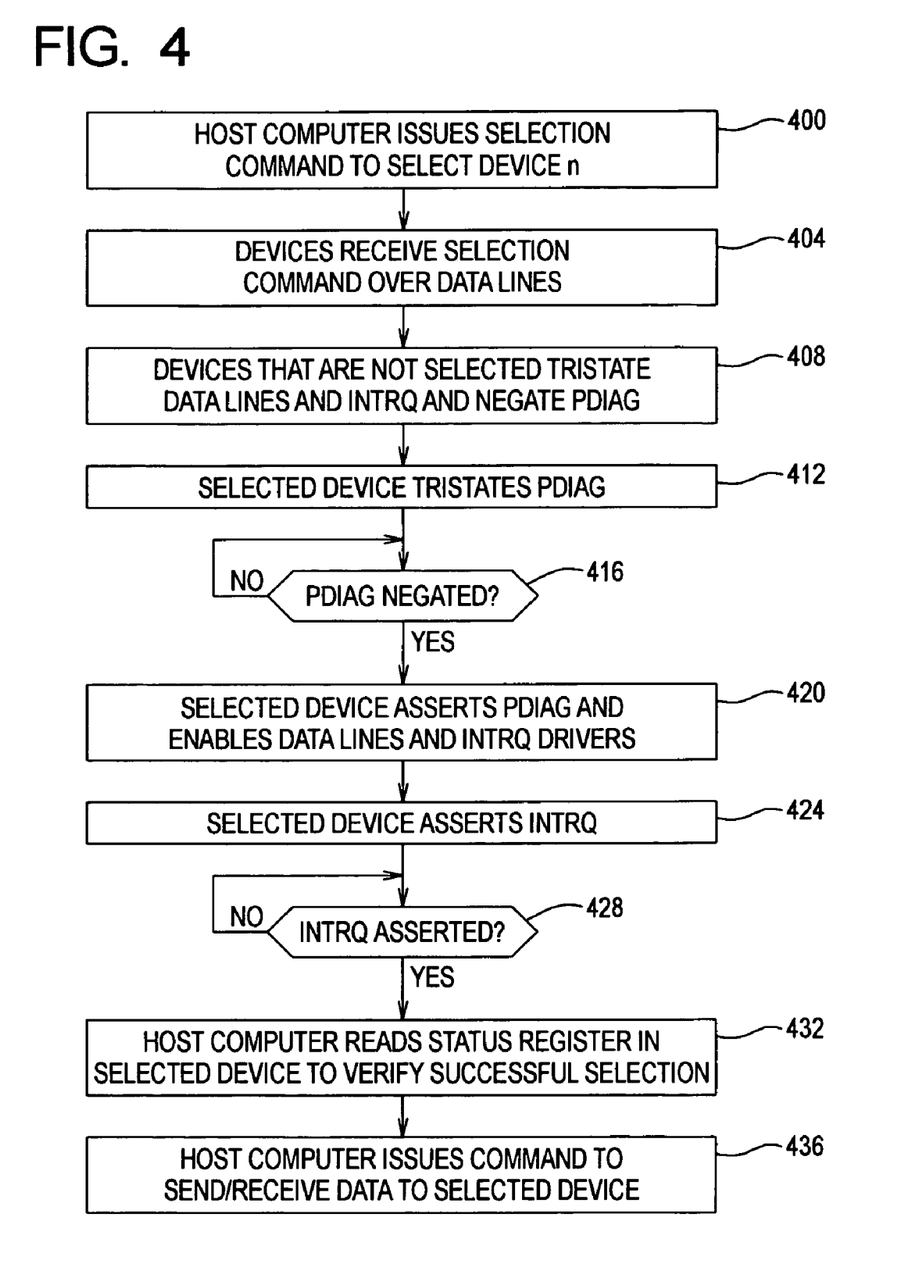
FIG. 4 is a flowchart illustrating operational steps taken during device selection without additional hardware in the bus system.

FIG. 4 is a flowchart illustrating the selection of a device 128 in the bus system 106 without the additional hardware. Initially, the host computer 104 issues a selection command that includes a selection identifier through the controller 120 to select one of the devices 128 (device n) (step 400). The devices 128 receive the selection command over the data lines of the ATA bus 124 (step 404). The devices 128 whose assigned identifiers do not match the selection identifier are not selected and tristate the data lines and INTRQ and negate PDIAG (step 408).

The selected device 128 whose assigned identifier matches the selection identifier tristates PDIAG (step 412), determines whether PDIAG is negated and idles until PDIAG is negated (step 416). Once PDIAG is negated, the selected device 128 asserts PDIAG and enables its data lines and INTRQ drivers (step 420) and asserts INTRQ (step 424).

The controller 120 determines whether INTRQ is asserted (step 428). If not, the controller 120 waits. If so, the controller 120 reads the status register in the selected device 128 to verify the successful selection of the selected device 128 (step 432). The host computer 104 then issues an additional command, such as to send or receive data, through the controller 120 to the selected device 128 (step 436). Following a read/write command to send or receive data, data may be transferred between the controller 120 and the selected device 128.

Figure 5:
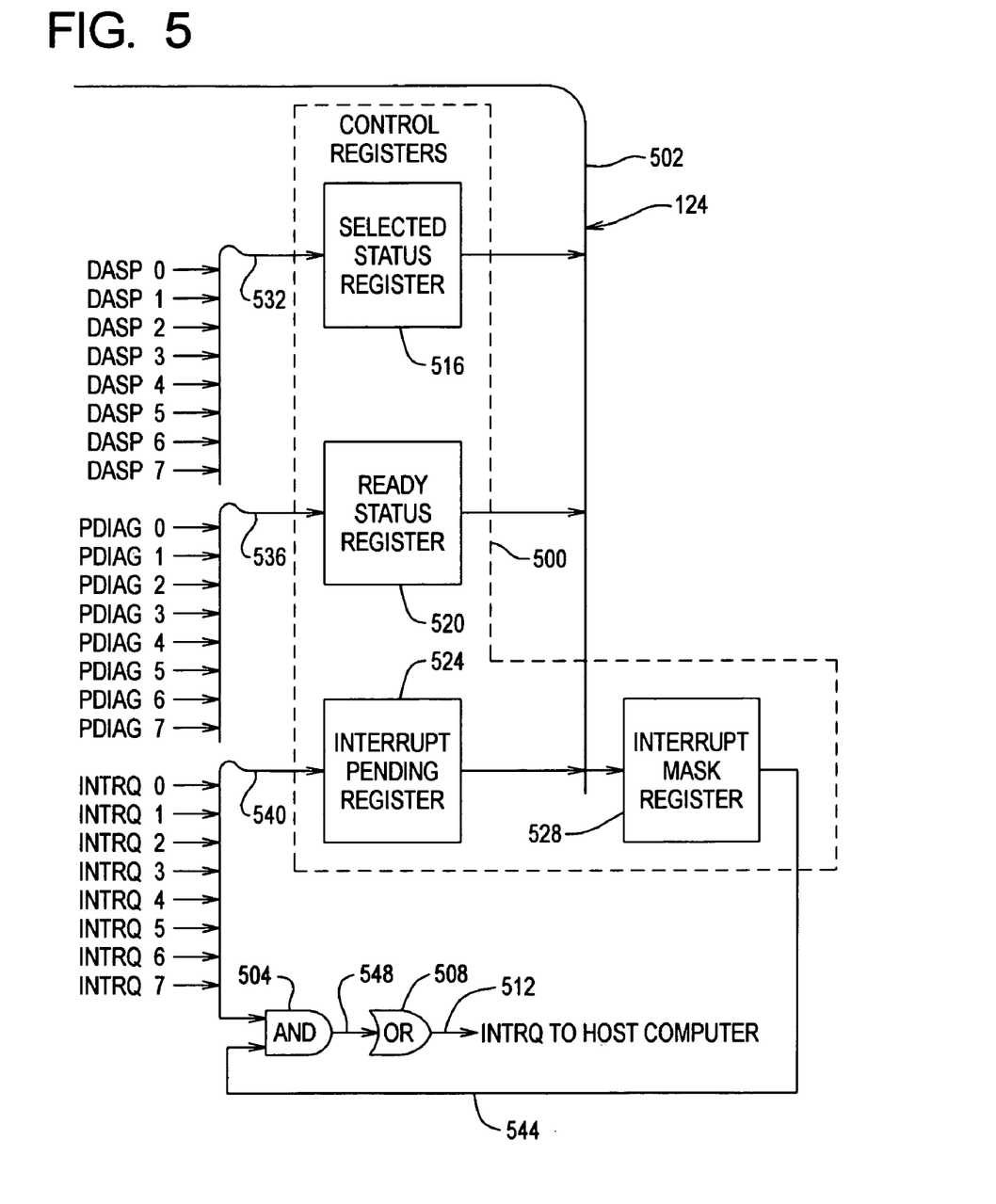
FIG. 5 is a block diagram illustrating the additional hardware in the bus system.

FIG. 5 shows the additional hardware in the bus system 106.

The controller 120 includes the control registers 500, an AND gate 504, an OR gate 508, an interrupt request signal line 512, an interrupt mask register bus 544 and an interrupt logic bus 548. The control registers 500 include a selected status register 516, a ready status register 520, an interrupt pending register 524 and an interrupt mask register 528. The control registers 500 may be accessed through the register access address (control block register 4) and the register access data (control block register 5) under the ATA protocol. The AND gate 504 is eight two-input AND gates, the OR gate 508 has eight inputs and a single output, the interrupt request signal line 512 is a single signal line and the interrupt mask register bus 544 and the interrupt logic bus 548 are eight-bit buses.

The ATA bus 124 includes the data bus 502 that includes the data lines, the DASP bus 532 that includes eight DASP lines (DASP 0–7), the PDIAG bus 536 that includes eight PDIAG lines (PDIAG 0–7) and the INTRQ bus 540 that includes eight INTRQ lines (INTRQ 0–7). Thus, the data bus 502, the DASP bus 532, the PDIAG bus 536 and the INTRQ bus 540 are eight-bit buses.

The DASP lines, the PDIAG lines and the INTRQ lines are dedicated to the individual devices 128. For example, DASP line 0, PDIAG line 0 and INTRQ line 0 are connected to device 128-0 and disconnected from devices 128-1 to 128-7, DASP line 1, PDIAG line 1 and INTRQ line 1 are connected to device 128-1 and disconnected from devices 128-0 and 128-2 to 128-7, and so on. Thus, unlike a conventional ATA bus which includes single DASP, PDIAG and INTRQ lines that are shared by the devices, the ATA bus 124 includes multiple DASP, PDIAG and INTRQ lines that are not shared by the devices 128. Instead, the devices 128 are each connected to a separate DASP, PDIAG and INTRQ line.

The DASP bus 532 is an input to the selected status register 516. Accordingly, each device 128 selectively drives a corresponding DASP line on the DASP bus 532 to set a corresponding bit in the selected status register 516. For example, device 128-0 selectively drives DASP line 0 to set a corresponding bit in the selected status register 516, device 128-1 selectively drives DASP line 1 to set a corresponding bit in the selected status register 516, and so on.

The PDIAG bus 536 is an input to the ready status register 520. Accordingly, each device 128 selectively drives a corresponding PDIAG line on the PDIAG bus 536 to set a corresponding bit in the ready status register 520. For example, device 128-0 selectively drives PDIAG line 0 to set a corresponding bit in the ready status register 520, device 128-1 selectively drives PDIAG line 1 to set a corresponding bit in the ready status register 520, and so on.

The INTRQ bus 540 is an input to the interrupt pending register 524. Accordingly, each device 128 selectively drives a corresponding INTRQ line on the INTRQ bus 540 to set a corresponding bit in the interrupt pending register 524. For example, device 128-0 selectively drives INTRQ line 0 to set a corresponding bit in the interrupt pending register 540, device 128-1 selectively drives INTRQ line 1 to set a corresponding bit in the interrupt pending register 540, and so on.

The interrupt mask register 528 is written by the controller 120. Typically, only one bit of the interrupt mask register 528 is set and the remaining bits of the interrupt mask register 528 are cleared. The set bit indicates which one of the devices 128 is the selected device 128.

The INTRQ bus 540 and the interrupt mask register bus 544 are inputs to the AND gate 504. The INTRQ bus 540 provides interrupt requests from the devices 128 to the AND gate 504, and the interrupt mask register 528 indicates the selected device 128 to the AND gate 504. The output of the AND gate 504 is sent across the interrupt logic bus 548 to the input of the OR gate 508, and the output of the OR gate 508 is sent across the interrupt request signal line 512 to the system bus 108 and in turn to the processor 112. If a set bit of the interrupt mask register 528 matches an asserted signal on the INTRQ bus 540 then a signal line on the interrupt logic bus 548 will be high, and therefore the output of the OR gate 508 will also be high and the interrupt request signal line 512 will pass the interrupt request to the processor 112. Thus, a high signal from the OR gate 508 indicates that the selected device 128, as confirmed by the selection stored in the interrupt mask register 528, is generating an interrupt request.

In an alternative embodiment, the ATA bus 124 may include decode logic to set the appropriate bits in the control registers 500, and each device 128 may be provided with a driver connected to each of the signal lines in the DASP bus 532, the PDIAG bus 536 and the INTRQ bus 540. That is, the DASP lines, the PDIAG lines and the INTRQ lines are shared by (rather than dedicated to) the individual devices 128. For example, DASP line 0, PDIAG line 0 and INTRQ line 0 are connected to devices 128-0 to 128-7, DASP line 1, PDIAG line 1 and INTRQ line 1 are connected to devices 128-0 to 128-7, and so on. Thus, unlike a conventional ATA bus which includes single DASP, PDIAG and INTRQ lines that are shared by the devices, the ATA bus 124 includes multiple DASP, PDIAG and INTRQ lines that are shared by the devices 128. Furthermore, the selection command sent over the data bus 502 and the DASP, PDIAG and INTRQ signals sent over the DASP bus 532, the PDIAG bus 536 and the INTRQ bus 540, respectively, can be eight-bit binary words with $2^8$ or 256 addresses. As a result, as many as 256 devices 128 can be connected to the ATA bus 124 provided the ATA bus 124 has 256 edge connectors and the hardware and/or signaling protocols are altered to accommodate increased signal path lengths.

The additional hardware also provides the opportunity for overlapping commands across the devices 128. The interrupt pending register 524 allows the processor 112 to identify each device 128 that has asserted INTRQ and therefore has a pending interrupt. For instance, if the device 128-0 asserts INTRQ line 0 and the device 128-1 asserts INTRQ line 1, thereby setting the corresponding two bits in the interrupt pending register 524, the commands can be overlapped by issuing a first command to the device 128-0 and before the first command operation is completed issuing a second command to the device 128-1.

Figure 6:
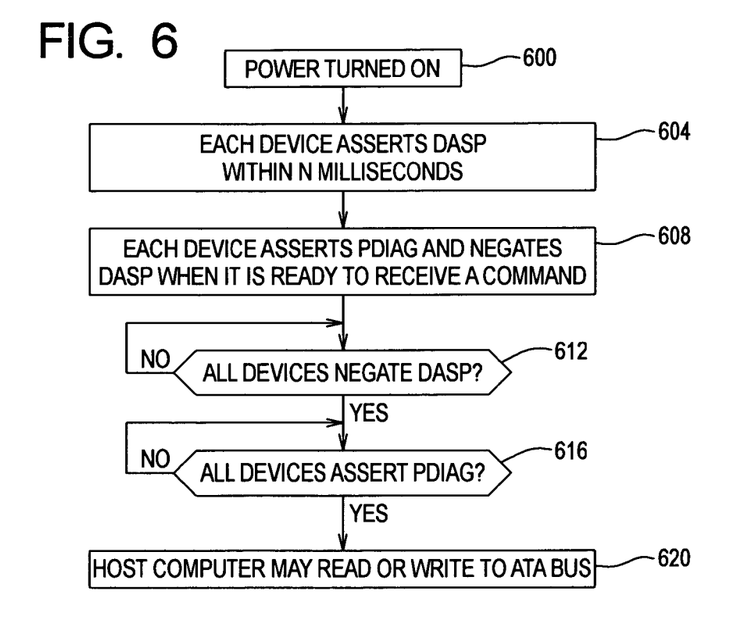
FIG. 6 is a flowchart illustrating operational steps taken during power-up of the bus system with the additional hardware.

FIG. 6 illustrates power-up of the bus system 106 with the additional hardware using an alternative protocol. Initially, the power is turned on (step 600). Each device 128 asserts DASP within a selected amount of time, for example from about 1–10 milliseconds (step 604). Each device 128 asserts PDIAG and negates DASP when it is ready to receive a command (step 608).

The controller 120 determines whether the devices 128 have negated DASP (step 612). If not, the controller 120 waits (step 612). If so, the controller 120 next determines whether the devices 128 have asserted PDIAG (step 616). If not, the controller 120 may notify the processor 112 of a problem or that fewer than the expected or possible number of devices 128 are connected, or wait until the devices 128 have asserted PDIAG. After the devices 128 have asserted PDIAG, or after the controller 120 has been instructed or has decided to continue with less than all of the devices 128 asserting PDIAG, the host computer 104 may read or write to the ATA bus 124 through the controller 120 (step 620).

Figure 7:
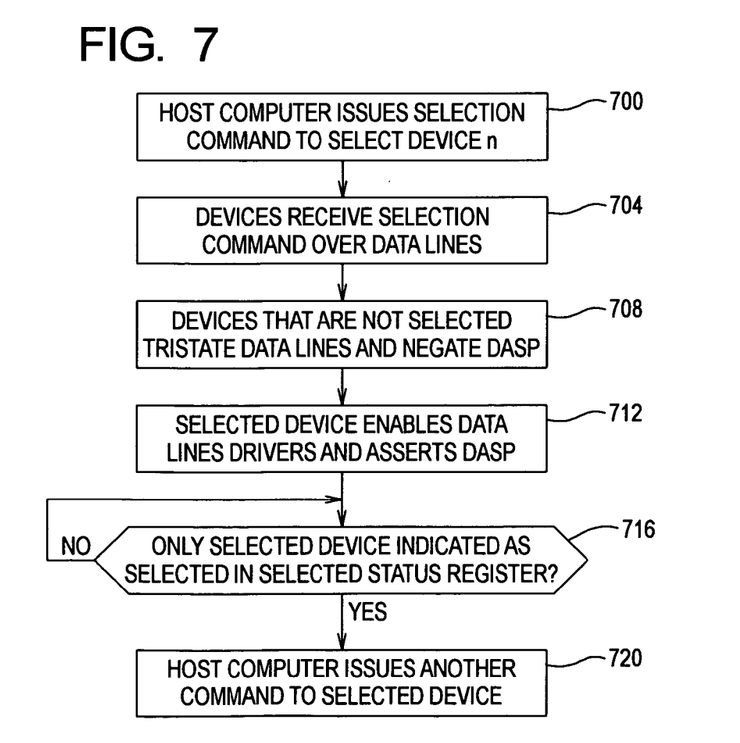
FIG. 7 is a flowchart illustrating operational steps taken during device selection with the additional hardware in the bus system.

FIG. 7 is a flowchart illustrating the selection of a device 128 in the bus system 106 with the additional hardware using an alternative protocol. Initially, the host computer 104 issues a selection command to select a device 128 (device n) (step 700). The devices 128 receive the selection command over the data lines of the data bus 502 (step 704). The devices 128 that are not selected tristate the data lines and negate DASP (step 708). The selected device 128 enables its data lines drivers and asserts DASP (step 712). The controller 120 determines whether only the intended device 128 is indicated as selected in the selected status register 516 (step 716). If so, the host computer 104 may issue another command, for example a command to read or write data, to the selected device 128 through the controller 120 and over the ATA bus 124 (step 720).

The present invention may include a back plane for implementing the physical channel of the ATA bus 124, particularly if the additional hardware is included. The back plane minimizes the distance that signals must travel between the controller 120 and the devices 128. The back plane also minimizes the capacitance in the signal lines between the controller 120 and the devices 128. The back plane may incorporate the DASP bus 532, the PDIAG bus 536, the INTRQ bus 540, the decode logic associated with these buses, and the AND gate 504, the OR gate 508, the interrupt request signal line 512 and the interrupt logic bus 548 for interrupt management.

The present invention may also include a frame for holding the devices 128 in close proximity to one another. For example, a frame for holding eight hard disk drives (the devices 128) having integrated connectors allows each hard disk drive to be connected to the ATA bus 124 in a modular fashion. The frame is no taller than necessary in order to accommodate the eight hard disk drives. For example, the frame may result in a hard disk drive stack height of 8½ inches.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described herein are further intended to explain the best way presently known of practicing the invention and to enable others skilled in the art to utilize the invention in such or in other embodiments or with various modifications required by their particular application or use of the invention. It is intended that the appended claims be construed to include the alternative embodiments to the extent permitted by the prior art.

What is claimed is:

1. In a device that includes an assigned identifier and ATA connection pins for connecting to corresponding signal lines in a single ATA bus, wherein the ATA connection pins include data lines, PDIAG and INTRQ connection pins, a method of operating the device, comprising:
    receiving a selection command that includes a selection identifier from the data lines;
    comparing the selection identifier with the assigned identifier; and
    asserting PDIAG and INTRQ in response to the selection identifier matching the assigned identifier.

2. The method of claim 1, including waiting until PDIAG is negated and then asserting PDIAG and INTRQ in response to the selection identifier matching the assigned identifier.

3. The method of claim 1, including asserting PDIAG and INTRQ in response to the selection identifier matching the assigned identifier and to determining that an ATA controller external to the device does not include additional hardware.

4. The method of claim 1, including clearing a BSY bit and setting a DRDY bit in a status register in response to the selection identifier matching the assigned identifier.

5. The method of claim 1, including enabling drivers for the data lines in response to the selection identifier matching the assigned identifier.

6. The method of claim 1, including asserting PDIAG and then asserting INTRQ in response to the selection identifier matching the assigned identifier.

7. The method of claim 1, including asserting PDIAG and enabling drivers for the data lines and INTRQ and then asserting INTRQ in response to the selection identifier matching the assigned identifier.

8. The method of claim 1, including tristating the data lines, PDIAG and INTRQ in response to the selection identifier not matching the assigned identifier.

9. The method of claim 1, including:
    receiving a second selection command that includes a second selection identifier from the data lines after asserting PDIAG and INTRQ in response to the selection identifier matching the assigned identifier;
    comparing the second selection identifier with the assigned identifier; and
    tristating the data lines, PDIAG and INTRQ in response to the second selection identifier not matching the assigned identifier.

10. The method of claim 1, wherein the device is a hard disk drive.

11. In a device that includes ATA connection pins for connecting to corresponding signal lines in a single ATA bus, wherein the ATA connection pins include data lines, PDIAG and INTRQ connection pins, a method of operating the device, comprising:
    assigning an assigned identifier;
    receiving a selection command that includes a selection identifier from the data lines;
    comparing the selection identifier with the assigned identifier;
    waiting until PDIAG is negated and then asserting PDIAG and INTRQ in response to the selection identifier matching the assigned identifier; and
    tristating the data lines, PDIAG and INTRQ in response to the selection identifier not matching the assigned identifier.

12. The method of claim 11, including asserting PDIAG and INTRQ in response to the selection identifier matching the assigned identifier and to determining that an ATA controller external to the device does not include additional hardware.

13. The method of claim 11, including tristating the data lines, PDIAG and INTRQ in response to the selection identifier not matching the assigned identifier and to determining that an ATA controller external to the device does not include additional hardware.

14. The method of claim 11, including clearing a BSY bit and setting a DRDY bit in a status register in response to the selection identifier matching the assigned identifier.

15. The method of claim 11, including enabling drivers for the data lines in response to the selection identifier matching the assigned identifier.

16. The method of claim 11, including asserting PDIAG and then asserting INTRQ in response to the selection identifier matching the assigned identifier.

17. The method of claim 11, including asserting PDIAG and enabling drivers for the data lines and INTRQ and then asserting INTRQ in response to the selection identifier matching the assigned identifier.

18. The method of claim 11, including assigning the assigned identifier using software switches.

19. The method of claim 11, including assigning the assigned identifier using jumpers.

20. The method of claim 11, wherein the device is a hard disk drive.

21. In a device that includes ATA connection pins for connecting to corresponding signal lines in a single ATA bus, wherein the ATA connection pins include data lines, DASP, PDIAG and INTRQ connection pins, a method of operating the device, comprising:
    assigning an assigned identifier;
    receiving a selection command that includes a selection identifier from the data lines;
    comparing the selection identifier with the assigned identifier;
    waiting until PDIAG is negated and then asserting PDIAG and INTRQ in response to the selection identifier matching the assigned identifier and to determining that an ATA controller external to the device does not include additional hardware; and
    tristating the data lines, PDIAG and INTRQ in response to the selection identifier not matching the assigned identifier and to determining that the controller does not include the additional hardware.

22. The method of claim 21, including asserting DASP in response to the selection identifier matching the assigned identifier and to determining that the controller includes the additional hardware.

23. The method of claim 21, including tristating the data lines and negating DASP in response to the selection identifier not matching the assigned identifier and to determining that the controller includes the additional hardware.

24. The method of claim 21, including clearing a BSY bit and setting a DRDY bit in a status register in response to the selection identifier matching the assigned identifier and to determining that the controller does not include the additional hardware.

25. The method of claim 21, including enabling drivers for the data lines in response to the selection identifier matching the assigned identifier and to determining that the controller does not include the additional hardware.

26. The method of claim 21, including asserting PDIAG and then asserting INTRQ in response to the selection identifier matching the assigned identifier and to determining that the controller does not include the additional hardware.

27. The method of claim 21, including asserting PDIAG and enabling drivers for the data lines and INTRQ and then asserting INTRQ in response to the selection identifier matching the assigned identifier and to determining that the controller does not include the additional hardware.

28. The method of claim 21, including assigning the assigned identifier using software switches.

29. The method of claim 21, including assigning the assigned identifier using jumpers.

30. The method of claim 21, wherein the device is a hard disk drive.

31. In an ATA bus system that includes a controller, a single ATA bus and first and second devices, wherein the ATA bus is connected to the controller and the devices and includes data, PDIAG and INTRQ lines, the first device includes a first assigned identifier and the second device includes a second assigned identifier, a method of selecting one of the devices, comprising:
    the controller sending a selection command that includes a selection identifier across the data lines to the devices;
    the first device comparing the selection identifier with the first assigned identifier;
    the second device comparing the selection identifier with the second assigned identifier; and
    the first device asserting PDIAG and INTRQ in response to the selection identifier matching the first assigned identifier.

32. The method of claim 31, including the first device waiting until PDIAG is negated by the second device and then asserting PDIAG and INTRQ in response to the selection identifier matching the first assigned identifier.

33. The method of claim 31, including the first device asserting PDIAG and INTRQ in response to the selection identifier matching the first assigned identifier and to determining that the controller does not include additional hardware.

34. The method of claim 31, including the first device clearing a BSY bit and setting a DRDY bit in its status register in response to the selection identifier matching the first assigned identifier.

35. The method of claim 31, including the first device enabling its drivers for the data lines in response to the selection identifier matching the first assigned identifier.

36. The method of claim 31, including the first device asserting PDIAG and then asserting INTRQ in response to the selection identifier matching the first assigned identifier.

37. The method of claim 31, including the first device asserting PDIAG and enabling its drivers for the data lines and INTRQ and then asserting INTRQ in response to the selection identifier matching the first assigned identifier.

38. The method of claim 31, including the second device tristating the data lines, PDIAG and INTRQ in response to the selection identifier not matching the second assigned identifier.

39. The method of claim 31, including:
    the controller sending a second selection command that includes a second selection identifier across the data lines to the devices after the first device asserts PDIAG and INTRQ in response to the selection identifier matching the first assigned identifier;
    the first device comparing the second selection identifier with the first assigned identifier;
    the second device comparing the second selection identifier with the second assigned identifier;
    the first device tristating the data lines, PDIAG and INTRQ in response to the second selection identifier not matching the first assigned identifier; and
    the second device asserting PDIAG and INTRQ in response to the second selection identifier matching the second assigned identifier.

40. The method of claim 31, wherein the devices are hard disk drives.

41. In an ATA bus system that includes a controller, a single ATA bus and first and second devices, wherein the ATA bus is connected to the controller and the devices and includes data, PDIAG and INTRQ lines, a method of selecting one of the devices, comprising:

the first drive receiving a first assigned identifier;
the second drive receiving a second assigned identifier;
the controller sending a selection command that includes a selection identifier across the data lines to the devices;
the first device comparing the selection identifier with the first assigned identifier;
the second device comparing the selection identifier with the second assigned identifier;
the first device waiting until PDIAG is negated and then asserting PDIAG and INTRQ in response to the selection identifier matching the first assigned identifier; and
the second device tristating the data lines, PDIAG and INTRQ in response to the selection identifier not matching the second assigned identifier.

42. The method of claim 41, including the first device asserting PDIAG and INTRQ in response to the selection identifier matching the first assigned identifier and to determining that the controller does not include additional hardware.

43. The method of claim 41, including the second device tristating the data lines, PDIAG and INTRQ in response to the selection identifier not matching the second assigned identifier and to determining that the controller does not include additional hardware.

44. The method of claim 41, including the first device clearing a BSY bit and setting a DRDY bit in its status register in response to the selection identifier matching the first assigned identifier.

45. The method of claim 41, including the first device enabling its drivers for the data lines in response to the selection identifier matching the first assigned identifier.

46. The method of claim 41, including the first device asserting PDIAG and then asserting INTRQ in response to the selection identifier matching the first assigned identifier.

47. The method of claim 41, including the first device asserting PDIAG and enabling its drivers for the data lines and INTRQ and then asserting INTRQ in response to the selection identifier matching the first assigned identifier.

48. The method of claim 41, including assigning the first assigned identifier to the first device using software switches in the first device.

49. The method of claim 41, including assigning the first assigned identifier to the first device using jumpers on the first device.

50. The method of claim 41, wherein the devices are hard disk drives.

51. In an ATA bus system that includes a controller, a single ATA bus and first and second devices, wherein the ATA bus is connected to the controller and the devices and includes data, DASP, PDIAG and INTRQ lines, a method of selecting one of the devices, comprising:

assigning a first assigned identifier to the first device;
assigning a second assigned identifier to the second device;
the controller sending a selection command that includes a selection identifier across the data lines to the devices;
the first device comparing the selection identifier with the first assigned identifier;
the second device comparing the selection identifier with the second assigned identifier;
the first device waiting until PDIAG is negated by the second device and then asserting PDIAG and INTRQ in response to the selection identifier matching the first assigned identifier and to determining that the controller does not include additional hardware; and
the second device tristating the data lines, PDIAG and INTRQ in response to the selection identifier not matching the second assigned identifier and to determining that the controller does not include the additional hardware.

52. The method of claim 51, including the first device asserting DASP in response to the selection identifier matching the first assigned identifier and to determining that the controller includes the additional hardware.

53. The method of claim 51, including the second device tristating the data lines and negating DASP in response to the selection identifier not matching the second assigned identifier and to determining that the controller includes the additional hardware.

54. The method of claim 51, including the first device clearing a BSY bit and setting a DRDY bit in its status register in response to the selection identifier matching the first assigned identifier and to determining that the controller does not include the additional hardware.

55. The method of claim 51, including the first device enabling its drivers for the data lines in response to the selection identifier matching the first assigned identifier and to determining that the controller does not include the additional hardware.

56. The method of claim 51, including the first device asserting PDIAG and then asserting INTRQ in response to the selection identifier matching the first assigned identifier and to determining that the controller does not include the additional hardware.

57. The method of claim 51, including the first device asserting PDIAG and enabling its drivers for the data lines and INTRQ and then asserting INTRQ in response to the selection identifier matching the first assigned identifier and to determining that the controller does not include the additional hardware.

58. The method of claim 51, including assigning the first assigned identifier to the first device using software switches in the first device.

59. The method of claim 51, including assigning the first assigned identifier to the first device using jumpers on the first device.

60. The method of claim 51, wherein the devices are hard disk drives.

61. In an ATA bus system that includes a controller, a single ATA bus and first and second devices, wherein the controller includes a selected status register, the ATA bus is connected to the controller and the devices and includes data lines and first and second DASP lines, the DASP lines are connected to the selected status register, the first device is connected to the first DASP line and includes a first assigned identifier and the second device is connected to the second DASP line includes a second assigned identifier, a method of selecting one of the devices, comprising:

the controller sending a selection command that includes a selection identifier across the data lines to the devices;
the first device comparing the selection identifier with the first assigned identifier;
the second device comparing the selection identifier with the second assigned identifier;
the first device asserting DASP in response to the selection identifier matching the first assigned identifier, thereby setting a first bit in the selected status register; and
the controller reading the selected status register to verify that the first device is selected and the second device is not selected.

62. The method of claim 61, including the first device asserting DASP in response to the selection identifier matching the first assigned identifier and to determining that the controller includes additional hardware.

63. The method of claim 61, including the first device enabling its drivers for the data lines in response to the selection identifier matching the first assigned identifier.

64. The method of claim 61, including the second device negating DASP in response to the selection identifier not matching the second assigned identifier.

65. The method of claim 61, including the second device tristating the data lines in response to the selection identifier not matching the second assigned identifier.

66. The method of claim 61, including the controller reading the selected status register to verify that the devices are ready to receive a command, and then the controller sending the selection command.

67. The method of claim 61, including:
the controller sending a second selection command that includes a second selection identifier across the data lines to the devices after the first device asserts DASP in response to the selection identifier matching the first assigned identifier;
the first device comparing the second selection identifier with the first assigned identifier;
the second device comparing the second selection identifier with the second assigned identifier;
the first device negating DASP in response to the second selection identifier not matching the first assigned identifier, thereby clearing the first bit in the selected status register;
the second device asserting DASP in response to the second selection identifier matching the second assigned identifier, thereby setting a second bit in the selected status register; and
the controller reading the selected status register to verify that the second device is selected and the first device is not selected.

68. The method of claim 61, wherein the first device is disconnected from the second DASP line and the second device is disconnected from the first DASP line.

69. The method of claim 61, wherein the first device is connected to the second DASP line and the second device is connected to the first DASP line.

70. The method of claim 61, wherein the devices are hard disk drives.

71. In an ATA bus system that includes a controller, a single ATA bus and first and second devices, wherein the controller includes a selected status register, the ATA bus is connected to the controller and the devices and includes data lines and first and second DASP lines, the DASP lines are connected to the selected status register, the first device is connected to the data lines and the first DASP line and includes a first assigned identifier and the second device is connected to the data lines and the second DASP line includes a second assigned identifier, a method of selecting one of the devices, comprising:
the controller sending a selection command that includes a selection identifier across the data lines to the devices;
the first device comparing the selection identifier with the first assigned identifier;
the second device comparing the selection identifier with the second assigned identifier;
the first device asserting DASP in response to the selection identifier matching the first assigned identifier, thereby setting a first bit in the selected status register;
the second device negating DASP in response to the selection identifier not matching the second assigned identifier, thereby not setting a second bit in the selected status register; and
the controller sending a read/write command across the ATA bus to the first device in response to reading the selected status register to verify that the first device is selected and the second device is not selected.

72. The method of claim 71, including the first device asserting DASP in response to the selection identifier matching the first assigned identifier and to determining that the controller includes additional hardware.

73. The method of claim 71, including the first device enabling its drivers for the data lines in response to the selection identifier matching the first assigned identifier.

74. The method of claim 71, including the second device negating DASP in response to the selection identifier not matching the second assigned identifier and to determining that the controller includes additional hardware.

75. The method of claim 71, including the second device tristating the data lines in response to the selection identifier not matching the second assigned identifier.

76. The method of claim 71, including the controller reading the selected status register to verify that the devices are ready to receive a command, and then the controller sending the selection command.

77. The method of claim 71, including:
the controller sending a second selection command that includes a second selection identifier across the data lines to the devices after the controller sends the read/write command;
the first device comparing the second selection identifier with the first assigned identifier;
the second device comparing the second selection identifier with the second assigned identifier;
the first device negating DASP in response to the second selection identifier not matching the first assigned identifier, thereby clearing the first bit in the selected status register;
the second device asserting DASP in response to the second selection identifier matching the second assigned identifier, thereby setting the second bit in the selected status register; and
the controller sending a second read/write command across the ATA bus to the second device in response to reading the selected status register to verify that the second device is selected and the first device is not selected.

78. The method of claim 71, wherein the first device is disconnected from the second DASP line and the second device is disconnected from the first DASP line.

79. The method of claim 71, wherein the first device is connected to the second DASP line and the second device is connected to the first DASP line.

80. The method of claim 71, wherein the devices are hard disk drives.

81. In an ATA bus system that includes a controller, a single ATA bus and first and second devices, wherein the controller includes a selected status register and an interrupt pending register, the ATA bus is connected to the controller and the devices and includes data lines, first and second DASP lines and first and second INTRQ lines, the DASP lines are connected to the selected status register, the INTRQ lines are connected to the interrupt pending register, the first device is connected to the data lines and the first DASP and INTRQ lines and includes a first assigned identifier and the second device is connected to the data lines and the second DASP and INTRQ lines includes a second assigned identifier, a method of selecting one of the devices, comprising:

the controller sending a selection command that includes a selection identifier across the data lines to the devices;

the first device comparing the selection identifier with the first assigned identifier;

the second device comparing the selection identifier with the second assigned identifier;

the first device asserting DASP in response to the selection identifier matching the first assigned identifier, thereby setting a first bit in the selected status register;

the second device negating DASP in response to the selection identifier not matching the second assigned identifier, thereby not setting a second bit in the selected status register; and the controller sending a read/write command across the ATA bus to the first device in response to reading the selected status register to verify that the first device is selected and the second device is not selected.

82. The method of claim 81, including the first device asserting DASP in response to the selection identifier matching the first assigned identifier and to determining that the controller includes additional hardware.

83. The method of claim 81, including the first device enabling its drivers for the data lines in response to the selection identifier matching the first assigned identifier.

84. The method of claim 81, including the second device negating DASP in response to the selection identifier not matching the second assigned identifier and to determining that the controller includes additional hardware.

85. The method of claim 81, including the second device tristating the data lines in response to the selection identifier not matching the second assigned identifier.

86. The method of claim 81, including the controller reading the selected status register to verify that the devices are ready to receive a command, and then the controller sending the selection command.

87. The method of claim 81, including:

the controller sending a second selection command that includes a second selection identifier across the data lines to the devices after the controller sends the read/write command;

the first device comparing the second selection identifier with the first assigned identifier;

the second device comparing the second selection identifier with the second assigned identifier;

the first device negating DASP in response to the second selection identifier not matching the first assigned identifier, thereby clearing the first bit in the selected status register;

the second device asserting DASP in response to the second selection identifier matching the second assigned identifier, thereby setting the second bit in the selected status register; and the controller sending a second read/write command across the ATA bus to the second device in response to reading the selected status register to verify that the second device is selected and the first device is not selected.

88. The method of claim 81, wherein the first device is disconnected from the second DASP and INTRQ lines and the second device is disconnected from the first DASP and INTRQ lines.

89. The method of claim 81, wherein the first device is connected to the second DASP and INTRQ lines and the second device is connected to the first DASP and INTRQ lines.

90. The method of claim 81, wherein the devices are hard disk drives.

91. In an ATA bus system that includes a controller, a single ATA bus and N devices, wherein the controller includes a selected status register, the ATA bus is connected to the controller and the devices and includes data lines and N DASP lines, the DASP lines are connected to the selected status register, the devices are each connected to the data lines and one of the DASP lines and disconnected from the other DASP lines such that each of the DASP lines is dedicated to one of the devices, the devices each include a unique assigned identifier, and N is an integer in the range of 3 to 8, a method of selecting one of the devices, comprising:

the controller sending a selection command that includes a selection identifier across the data lines to the devices;

the devices each comparing the selection identifier with its assigned identifier;

the device that matches the selection identifier to its assigned identifier becoming a selected device that asserts DASP in response to the selection identifier matching its assigned identifier, thereby setting a corresponding bit in the selected status register;

the other devices that each do not match the selection identifier to its assigned identifier becoming a non-selected device that negates DASP in response to the selection identifier not matching its assigned identifier, thereby not setting a corresponding bit in the selected status register; and the controller sending a read/write command across the ATA bus to the selected device in response to reading the selected status register to verify that the selected device is selected and the non-selected devices are not selected.

92. The method of claim 91, including the selected device asserting DASP in response to the selection identifier matching its assigned identifier and to determining that the controller includes additional hardware.

93. The method of claim 91, including the selected device enabling its drivers for the data lines in response to the selection identifier matching its assigned identifier.

94. The method of claim 91, including the non-selected devices each negating DASP in response to the selection identifier not matching its assigned identifier and to determining that the controller includes additional hardware.

95. The method of claim 91, including the non-selected devices each tristating the data lines in response to the selection identifier not matching its assigned identifier.

96. The method of claim 91, including the controller reading the selected status register to verify that the devices are ready to receive a command, and then the controller sending the selection command.

97. The method of claim 91, including:

the controller sending a second selection command that includes a second selection identifier across the data lines to the devices after the controller sends the read/write command;

the devices each comparing the second selection identifier with its assigned identifier;

the device that matches the second selection identifier to its assigned identifier becoming the selected device that asserts DASP in response to the second selection identifier matching its assigned identifier, thereby setting a corresponding bit in the selected status register;

the other devices, including the device selected by the selection command, that each do not match the second selection identifier to its assigned identifier becoming a non-selected device that negates DASP in response to the second selection identifier not matching its assigned identifier, thereby not setting a corresponding bit in the selected status register; and the controller sending a second read/write command across the ATA bus to the selected device in response to reading the selected status register to verify that the selected device is selected and the non-selected devices are not selected.

98. The method of claim 91, wherein the controller includes a ready status register, the ATA bus includes N PDIAG lines, the PDIAG lines are connected to the ready status register, the devices are each connected to one of the PDIAG lines and disconnected from the other PDIAG lines such that each of the PDIAG lines is dedicated to one of the devices, and the method includes a power-up sequence, comprising:

the devices each asserting DASP within a predetermined time of the power turning on;

the devices each asserting PDIAG and negating DASP when it is ready to receive a command; and the controller sending a command across the ATA bus to the devices in response to reading the selected status register and the ready status register to verify that the devices are ready to receive a command.

99. The method of claim 91, wherein the controller includes an interrupt pending register, an interrupt mask register and decoding logic, the ATA bus includes N INTRQ lines, the INTRQ lines are connected to the interrupt pending register, the devices are each connected to one of the INTRQ lines and disconnected from the other INTRQ lines such that each of the INTRQ lines is dedicated to one of the devices, and the method includes interrupt handling, comprising:

the controller setting a bit in the interrupt mask register corresponding to the selected device;

the controller not setting bits in the interrupt mask register corresponding to the non-selected devices;

the selected device asserting INTRQ, thereby setting a corresponding bit in the interrupt pending register;

a non-selected device asserting INTRQ, thereby setting a corresponding bit in the interrupt pending register;

the decoding logic generating an interrupt request for a host computer in response to the interrupt pending register and the interrupt mask register indicating that the selected device is asserting INTRQ; and the decoding logic not generating the interrupt request for the host computer in response to the interrupt pending register and the interrupt mask register indicating that the non-selected device is asserting INTRQ.

100. The method of claim 91, wherein the devices are hard disk drives.

* * * * *